United States Patent [19]

Thome et al.

[11] Patent Number: 5,423,021

[45] Date of Patent: Jun. 6, 1995

[54] AUXILIARY CONTROL SIGNAL DECODE USING HIGH PERFORMANCE ADDRESS LINES

[75] Inventors: Gary W. Thome, Houston; Harry R. Roger, Jr., Spring, both of Tex.

[73] Assignee: Compaq Computer Corporation, Houston, Tex.

[21] Appl. No.: 166,275

[22] Filed: Dec. 13, 1993

Related U.S. Application Data

[63] Continuation of Ser. No. 944,804, Sep. 14, 1992, abandoned, and a continuation of Ser. No. 431,655, Nov. 3, 1989, abandoned.

[51] Int. Cl.⁶ .................. G06F 13/14; G06F 13/18
[52] U.S. Cl. .................. 395/425; 364/DIG. 1; 364/240.3; 364/965.77
[58] Field of Search ... 364/200 MS File, 900 MS File; 395/400 MS, 425 MS

[56] References Cited

U.S. PATENT DOCUMENTS

| | | |
|---|---|---|
| 4,272,819 | 6/1981 | Katsumata et al. .................. 395/425 |
| 4,318,175 | 3/1982 | Hanley .................. 395/425 |
| 4,596,004 | 6/1986 | Kaufman .................. 365/233 |
| 4,665,506 | 5/1987 | Cline et al. .................. 365/189.01 |
| 4,697,262 | 9/1987 | Segal et al. .................. 370/84 |
| 4,727,491 | 2/1988 | Culley .................. 395/325 |
| 4,750,111 | 6/1988 | Crosby, Jr. et al. .................. 364/200 |
| 4,787,032 | 11/1988 | Culley .................. 364/200 |
| 4,833,605 | 5/1989 | Terada et al. .................. 395/400 |
| 4,835,681 | 5/1989 | Culley .................. 364/200 |
| 4,837,682 | 6/1989 | Culler .................. 395/325 |
| 4,885,482 | 12/1989 | Sharp et al. .................. 364/238.2 |
| 4,893,279 | 1/1990 | Rahman et al. .................. 364/900 |
| 5,091,850 | 2/1992 | Culley .................. 395/400 |
| 5,125,088 | 6/1992 | Culley .................. 395/500 |
| 5,157,776 | 10/1992 | Foster .................. 395/425 |
| 5,159,679 | 10/1992 | Culley .................. 395/425 |
| 5,165,037 | 11/1992 | Culley .................. 395/800 |
| 5,168,562 | 12/1992 | Estepp et al. .................. 395/325 |
| 5,241,631 | 8/1993 | Smith et al. .................. 395/325 |
| 5,253,385 | 10/1993 | Thoma, III et al. .................. 395/425 |

*Primary Examiner*—Reba I. Elmore
*Attorney, Agent, or Firm*—Pravel, Hewitt, Kimball & Krieger

[57] ABSTRACT

An apparatus that develops the M16* control signal, which indicates a 16 bit memory device is responding, from the latched address LA<> lines to provide a faster response time than if it were decoded from the SA<> address lines. Decode values for specific 8 kbyte blocks in a 128 kbyte address range are stored. The particular value for an 8 kbyte block is multiplexed and provided to the M16* line based on the decode of the LA address lines.

4 Claims, 4 Drawing Sheets

AUXILIARY CONTROL SIGNAL DECODE USING HIGH PERFORMANCE ADDRESS LINES

This is a continuation of application Ser. No. 07/944,804 filed on Sep. 14, 1992 now abandoned and Ser. No. 07/431,655 filed on Nov. 3, 1989, now abandoned.

BACKGROUND OF THE INVENTION

1. Field of the Invention

The present invention relates to compatibility considerations in computer systems, and more particularly to auxiliary address decodes which provide faster response times for addressing control signals to meet address decode delay requirements.

2. Description of the Prior Art

The personal computer industry is a vibrant and growing field that continues to evolve as new innovations occur. The driving force behind this innovation has been the increasing demand for faster and more powerful personal computers. Another major factor in the success of the personal computer industry has been the concern on the part of system designers to maintain compatibility between the newer systems that are being developed and the older systems that are currently on the market or in use.

In 1981, International Business Machines Corp. (IBM) introduced its personal computer, the IBM PC. The IBM PC utilized an Intel Corporation (Intel) 8088 as the microprocessor. The 8088 included 20 address pins, which meant that it could directly address 1 Mbyte of memory. The bus architecture in the IBM PC utilized 20 address lines which were referred to as the system address lines SA<19-0>. The SA<19-0> address lines utilized a timing standard that was designed for the relatively slow memory devices available at that time and the timing of the signals produced by the 8088.

Soon after the introduction of the IBM PC, however, 1 Mbyte of memory was no longer sufficient to meet the increasing consumer demand for computer memory, and it became necessary to increase the amount of memory addressability to enable larger amounts of memory to be used in the computer. Therefore, Intel introduced the 80286 microprocessor which included 24 address lines, enabling it to directly address 16 Mbytes of memory. To take advantage of the increased addressing capability of the 80286, it became necessary to extend the address bus of the IBM PC to 24 address lines.

During this period from the introduction of the 8088 microprocessor to the introduction of the 80286 microprocessor, memory component capabilities and speeds increased dramatically, resulting in faster memory access times. The original SA<19-0> address lines used in the IBM PC incorporated a timing standard that was too slow to take advantage of these advances in memory speeds. Therefore, an extended version of the bus architecture used in the IBM PC was introduced in a new personal computer from IBM called the PC/AT. The bus architecture in the PC/AT included a new set of address lines, the latched address lines LA<23-17>, which incorporated a timing standard that took advantage of these faster memory devices. The bus interface standard used in the IBM PC/AT has generally become known as the industry standard architecture (ISA).

As is inevitable in the computer and electronics industry, capabilities of the various components, including memory components, continued to increase. In conjunction with these developments, Intel introduced the 80386 microprocessor. The 80386 microprocessor has an increased speed of operation over the 80286 and includes 32 address lines, allowing for up to 4 Gbytes of direct addressability. In order to take full advantage of the full capabilities of the 80386 microprocessor, an extended version of the ISA was developed called the extended industry standard architecture (EISA). EISA includes a 32-bit address bus, a 32-bit data bus, and full backwards compatability with all ISA devices and software.

The MS-DOS operating system was developed by Microsoft Corp. and IBM as the operating sytem used by the IBM PC and PC/AT. To the operating system and the ISA, the first 640 kbytes of memory is available for use by the operating system and user programs. Portions of the remaining 384 kbytes were reserved for use by the BIOS read only memories (ROM's) of the computer, video memory and peripheral interface boards. Generally the peripheral I/O cards or modules are allocated a 128 kbyte block of memory located from memory address 000C 0000h to 000D FFFFh. The various boards use portions of this memory as necessary. Exemplary boards include network interface boards, optional video boards, and so on.

A standard feature of computers based on the ISA is that certain ISA control signals are decoded from the memory address space and are used to facilitate memory accesses. One such signal that is generally decoded from a memory address for external cards is the M16* signal, which, when asserted low, indicates to the system that the addressed memory is capable of transferring 16 bits of data at once.

Because the M16* signal was available only in systems having the latched address lines LA<23-17>, it was presumed that 16 bit devices would use those signals for their address decode, thus allowing the M16* signal to be developed at a given time in a cycle.

However, some board designers still developed the address decode from SA<19-0> signals but drove the M16* signal to indicate 16 bit transfers. This has created a problem in some computer systems because the M16* signal thus develops too late in the cycle and is not recognized, thus resulting in a performance decrease because 8 bit cycles are then performed.

SUMMARY OF THE INVENTION

The present invention incudes logic circuitry that decodes 8 kbyte blocks of memory in a 128 kbyte memory space, preferably the memory space utilized by the peripheral interface boards, from the LA address lines and enables the M16* signal if appropriate for that particular memory block. Therefore, the M16* signal, which was formerly decoded from the SA address lines on certain external I/O cards, may now be decoded from the LA address lines. Since this decode is done entirely with the LA address lines on the system board, the M16* signal appears sooner, allowing 16 bit cycles to be properly performed for those addresses. Thus, the present invention allows those ISA cards which decode the M16* signal from the SA address lines to meet the EISA M16* decode delay requirements as listed in the EISA specification.

BRIEF DESCRIPTION OF THE DRAWINGS

A better understanding of the present invention can be obtained when the following detailed description of the preferred embodiment is considered in conjunction with the following drawings, in which.

DETAILED OF THE PREFERRED EMBODIMENT

Figure 1:
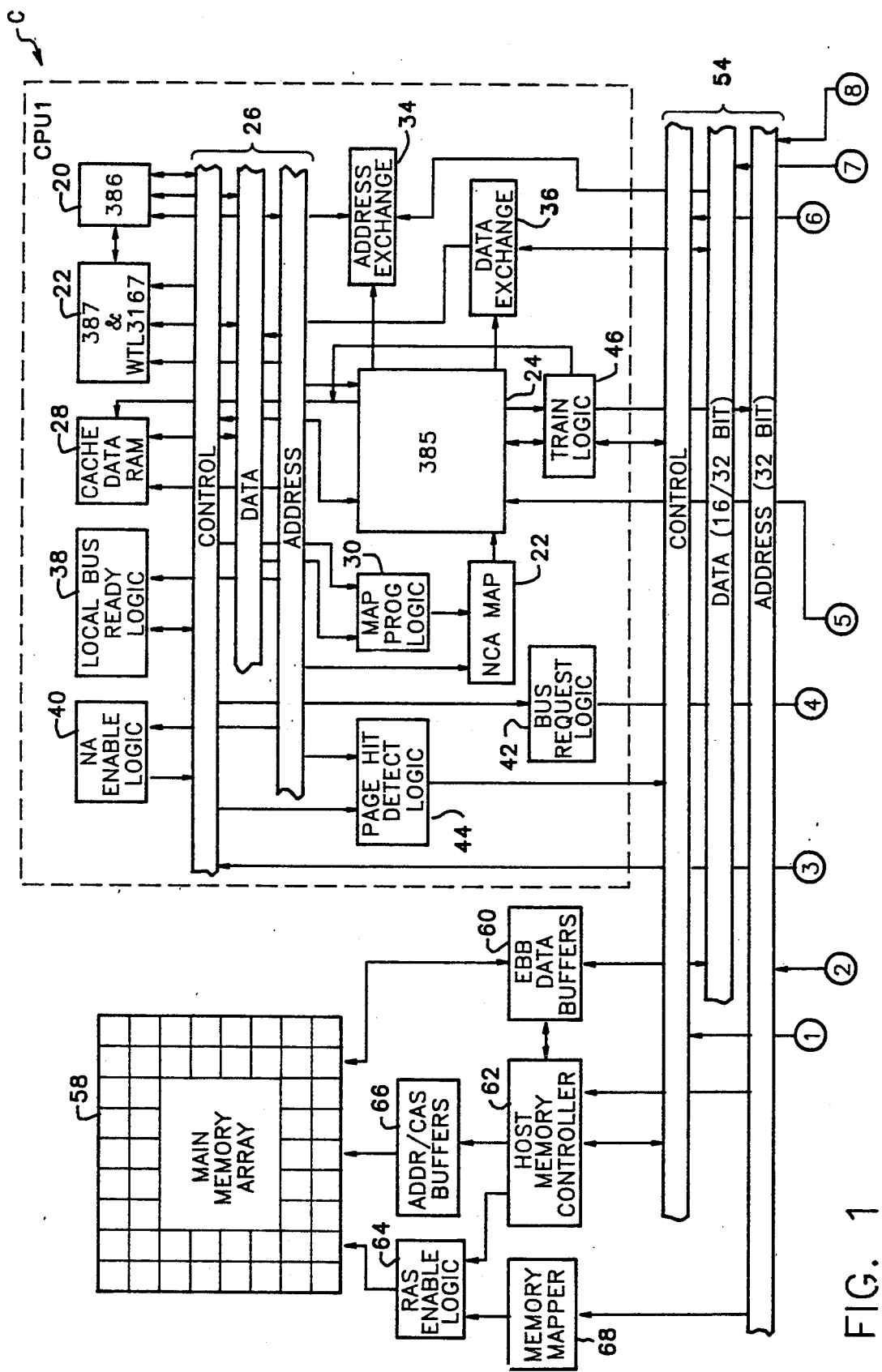
FIGS. 1, 2A and 2B are schematic block diagrams of a computer system incorporating the present invention.
Figure 2A:
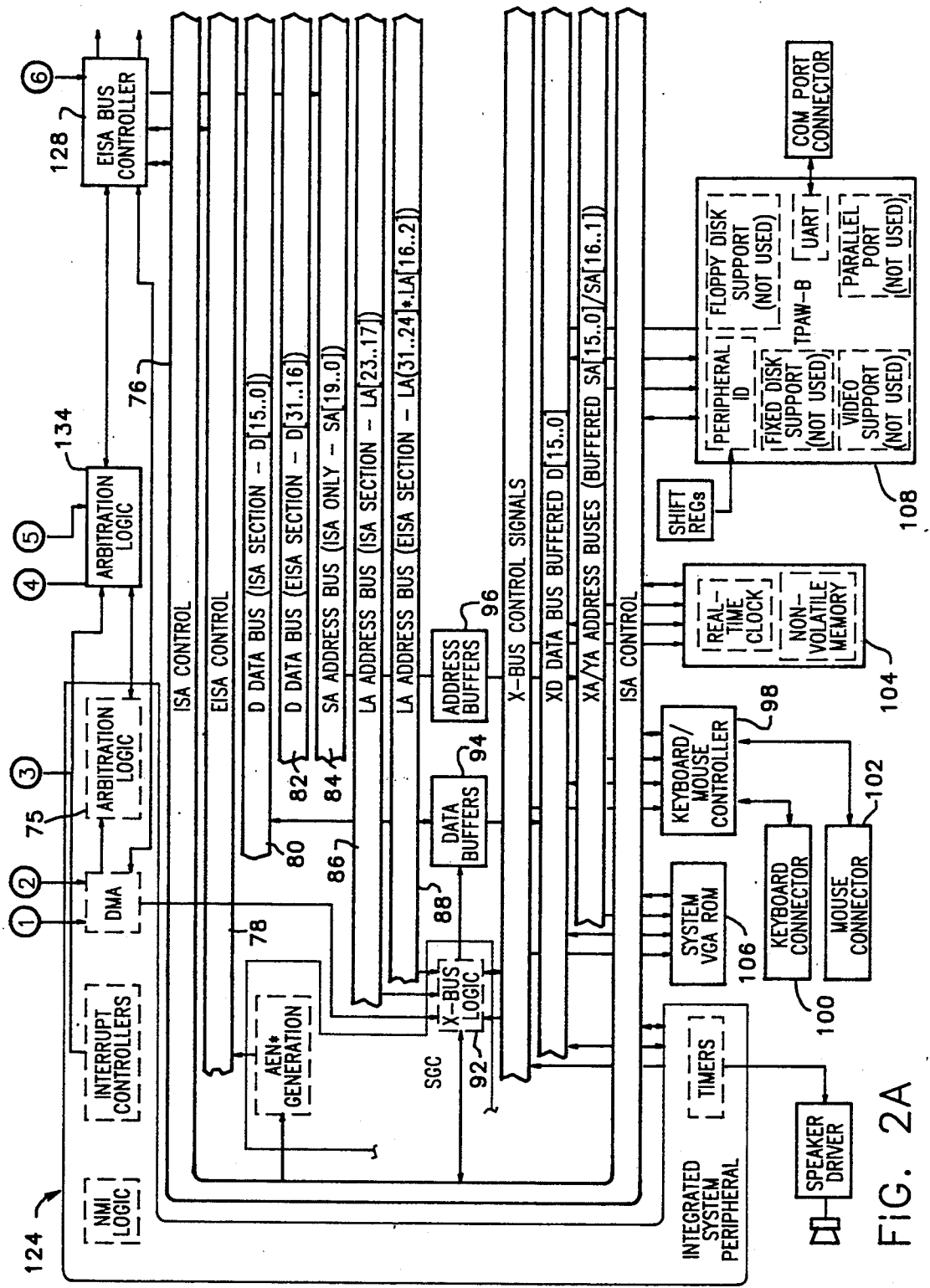
Figure 2B:
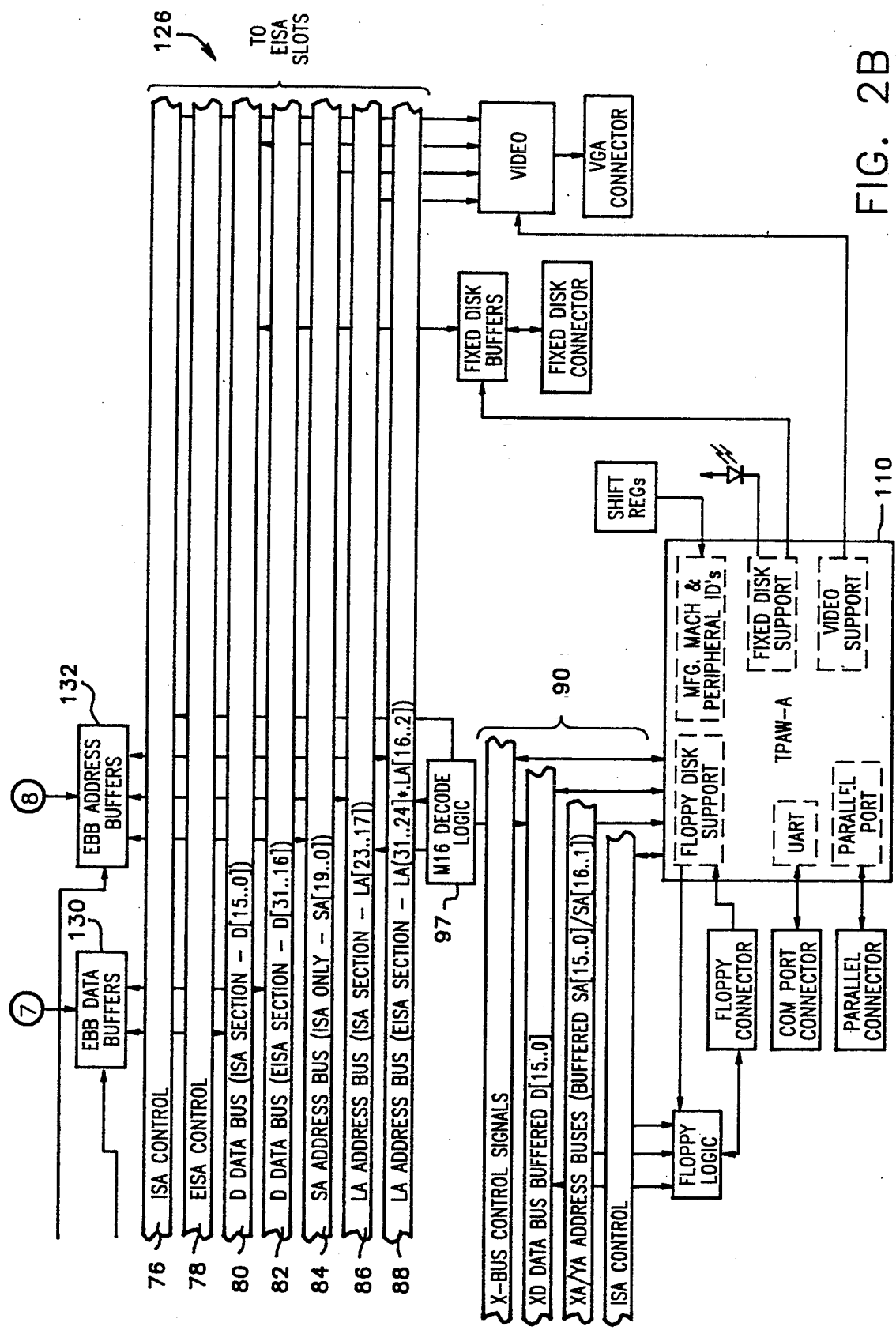

Referring now to FIGS. 1, 2A and 2B, the letter C designates a computer system incorporating the present invention. For clarity, system C is shown in two portions, with the interconnections between FIGS. 1, 2A and 2B designated by reference to the circled numbers one to eight. System C is comprised of a number of block elements interconnected via four buses. Throughout this specification, signal mnemonics with an asterisk following the signal descriptors indicates the signal is active at a logic low level and is the inverse of the signal without the asterisk. Signal mnemonics having numbers or ranges between angled brackets refer to those particular bits or positions in a bus. The details of the portion of the system illustrated in FIGS. 1, 2A and 2B that are not discussed in detail below are not significant to the present invention other than to illustrate an example of a fully configured computer system.

In FIG. 1, a computer system C is depicted. A central processing unit CPU comprises a processor 20, a numerical coprocessor 22 and a cache memory controller 24 and associated logic circuits connected to a local processor bus 26. Associated with the cache controller is high speed cache data random access memory 28, noncacheable memory address map programming logic circuitry 30, noncacheable address memory 32, address exchange latch circuitry 34 and data exchange transceiver 36. Associated with the CPU also are local bus ready logic circuitry 38, next address enable logic circuitry 40 and bus request logic circuitry The processor 20 is preferably an Intel 80386 microprocessor. Alternatively, each CPU could be based on an Intel 80486 microprocessor coupled with external cache memory. In that instance the noncacheable address-related items are not present on the CPU. The processor 20 has its control, address and data lines interfaced to the local processor bus 26. The coprocessor 22 is preferably an Intel 80387 and/or Weitek WTL 3167 numeric coprocessor interfacing with the local processor bus 26 and the processor 20 in the conventional manner. The cache ram 28 is preferably suitable high-speed static random access memory which interfaces with the address and data elements of the local bus 26 under control of the cache controller 24 to carry out required cache memory operations. The cache controller 24 is preferably an Intel 82385 cache controller configured to operate in two-way set associative master mode. In the preferred embodiment the components are the 33 MHz versions of the respective units. Address latch circuitry 34 and data transceiver 36 interface the cache controller 24 with the processor 20 and provide a local bus interface between the local processor bus 26 and a host bus 54.

The main memory array 58 is preferably dynamic random access memory. Memory 58 interfaces with the host bus 54 via a data buffer circuit 60, a memory controller circuit 62 and a memory mapping circuit 68.

In the drawings, system C is configured having the processor bus 26, the host bus 54, an extended industry standard architecture (EISA) bus 126 (FIG. 2A and 2B) and an X bus 90. The EISA specification Version 3.1 included as Appendix 1 to U.S. Pat. No. 5,101,492, which is hereby incorporated by reference as though set forth fully herein to fully explain requirements of an EISA system. The portion of system C illustrated in FIG. 2A and 2B is essentially a configured EISA system which includes the necessary EISA bus 126, an EISA bus controller 128, data latches and transceivers 130 and address latches and buffers 132 to interface between the EISA bus 126 and the host bus 54. Also illustrated in FIGS. 2A is an integrated system peripheral 124, which incorporates a number of the elements used in an EISA-based computer system.

The EISA bus 126 includes ISA and EISA control buses 76 and 78, ISA and EISA data buses 80 and 82 and various address buses, including the system address bus SA<19-0> 84, which was the original address bus used in the IBM PC, and the latched address bus LA<23-17> 86, LA<31-24> and LA<16-2> 88. The latched address lines LA<31-2> incorporate a faster timing standard than that used in the SA<19-0> address lines, and therefore addresses on the LA<31-2> lines are presented earlier in a cycle than those on the SA<19-0> address lines.

System peripherals are interfaced via the X bus 90 in combination with the ISA control bus 76 from the EISA bus 126. Control and data/address transfer for the X bus 90 are facilitated by X bus control logic 92, data transceivers 94 and address latches 96. A block circuit 97 containing the M16* signal decode logic according to the present invention is interfaced to the LA<23-17> address bus 86, the LA<16-2> address bus 88, the XD data bus, and the ISA control bus 76.

Attached to the X bus 90 are various peripheral devices such as keyboard/mouse controller 98 which interfaces the X bus 90 with a suitable keyboard and mouse via connectors 100 and 102, respectively. Also attached to the X bus 90 are read only memory circuits 106 which contain basic operations software for the system C and for system video operations. A serial communications port 108, and a block circuit 104 containing a real time clock and non-volatile memory are also connected to the system C via the X bus 90. Floppy and fixed disk support, a parallel port, a second serial port, and video support circuits are provided in block circuit 110.

Figure 3:
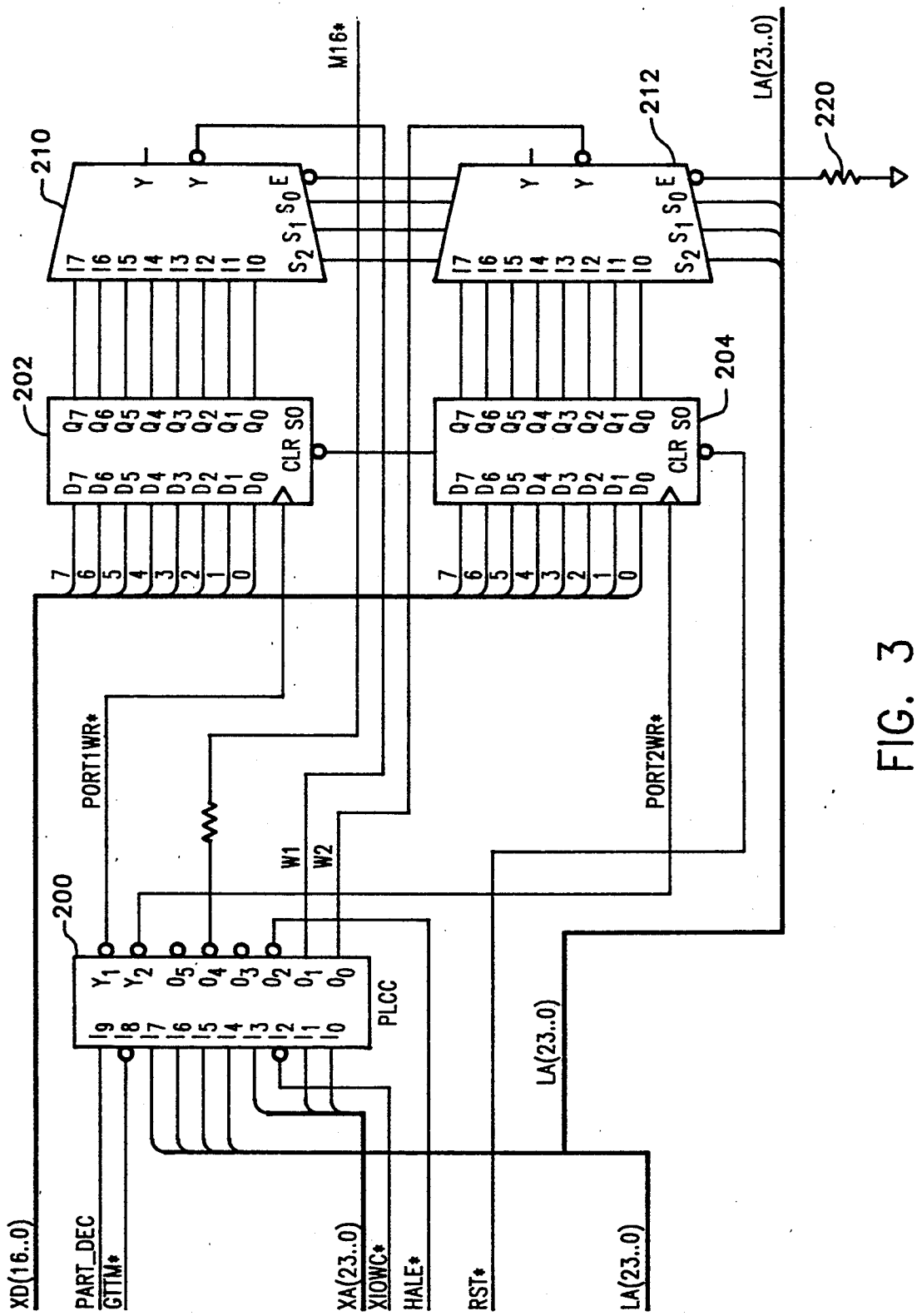
FIG. 3 is a schematic diagram of the auxiliary M16* decode logic circuitry of FIGS. 2A and 2B according to the present invention.

Referring now to FIG. 3, the M16* signal decode logic circuitry 97 is shown. The M16* signal decode is performed from the LA<> address lines, therefore providing a faster decode than if the signal was decoded from the SA<> address lines. The present invention is designed to decode the M16* signal for each of the 8 kbyte blocks in the peripheral memory space from 000C 0000h to 000D FFFFh, but the use of this design to decode other control signals and other memory or I/O spaces is contemplated.

The X bus data lines XD<7-0> are connected to the D inputs of two 8-bit D-type flip-flops 202 and 204. The eight Q outputs of the flip-flop 202 are connected to the inputs of an 8 to 1 multiplexer 210. The eight Q outputs of the flip-flop 204 are connected to the inputs of an 8 to 1 multiplexer 212. The flip-flops 202 and 204 are clocked by signals generated from a programmable array logic (PAL) device 200. The signals are referred to as PORT1WR* and PORT2WR*, respectively. The PORT1WR* signal represents that I/O port 0CA0h is being addressed on the X bus and an I/O write operation is occurring, and the PORT2WR* signal represents that I/O address 0CA1h is being addressed on the X bus and an I/O write operation is occurring. The PORT1WR* and PORT2WR* signals therefore act as select lines to differentiate between which address, 0CA0b or 0CA1h, is being addressed. The I/O addresses 0CA0h and 0CA1h contain a map of decodes for the M16* signal from the 000C 0000h–000D FFFFh addresses with port 1 at address 0CA0h containing the M16* signal decode map for the 8 kbyte blocks between addresses 000C 0000h and 000C FFFFh, and port 2 at address 0CA1h containing the M16* signal decode map for the 8 kbyte blocks between addresses 000D 0000h and 000D FFFFh. Therefore, when a write operation to I/O address 0CA0h or 0CA1h is decoded, the respective 8-bit flip-flop 202 and 204 has its clock input pulsed, allowing it to latch the data present on the XD<7-0> lines and present the data to its Q outputs and thus to its respective multiplexer 210 or 212. The inverted clear input of each of the flip-flops 202 and 204 is connected to a system reset signal referred to as RST* to allow for a proper resetting of the flip-flops 202 and 204.

The LA address signals LA<15>, LA<14>, and LA<13> are connected to the select inputs S2, S1 and S0 of the 8 to 1 multiplexers 210 and 212. The LA<15>, LA<14>, and LA<13> signals determine the 8 kbyte block that is being addressed from a 64 kbyte space and are thus used to select the M16* decode value from the outputs of the flip-flops 202 and 204. The inverted enable input E of each of the multiplexors 210 and 212 is connected to a pull-down resistor 220 so that the outputs are always enabled. The inverted Y output of the 8 to 1 multiplexer 210 is a signal referred to as W1 and the inverted Y output of the 8 to 1 multiplexer 212 is a signal referred to as W2. The W1 and W2 signals are the M16* signal decode value for the particular 8 kbyte block in the 64 kbyte block addressed by the address lines LA <15-13>.

The logic circuitry 97 includes a PAL 200 that receives the W1 and W2 signals as well as other control signals and data inputs to generate the appropriate level to apply to the M16* line to produce an M16* signal having the proper level. A partially decoded address signal referred to as PART_DEC is input to the PAL 200 and it decodes the XA address lines XA<9:8> and XA<6:1> and the AEN signal. The equation for the PART_DEC signal is:

$$PART\_DEC = XA<9>* \times XA<8>* \times XA<6>* \times XA<5> \times XA<4>* \times XA<3>* \times XA<2>* \times XA<1>* \times AEN*$$

A signal referred to as GT1M* is connected to an input of the PAL 200, and it represents, when low, that the current memory address is greater than 1 Mbyte. The host address latch enable signal HALE* is connected to an input of the PAL 200, and is used to latch and deglitch the GT1M signal. An I/O write control strobe referred to as XIOWC* is connected to an input of the PAL 200, and it indicates, when asserted, that valid data is present on the XD data bus for receipt by an I/O device. Other signals that are input to the PAL 200 include the XA<11>, XA<10> and XA<0> address signals, and the LA<19>, LA<18>, LA<17>, and LA<16> signals.

The PORT1WR* and PORT2WR* signals are output from the PAL 200 and are connected to the clocking inputs of the flip-flops 202 and 204. The equation for the PORT1WR signal is:

$$PORT1WR = PART\_DEC \times XA<11> \times XA<10> \times XA<0>* \times XIOWC$$

The equation for the PORT2WR* signal is:

$$PORT2WR = PART\_DEC \times XA<11> \times XA<10> \times XA<0> \times XIOWC.$$

Thus, the PORT1WR and PORT2WR signals are fully decoded to the appropriate I/O port address and include signal timing information so that the data is properly latched onto the flip-flops 202 and 204.

A signal referred to as LGT1MEG is a latched version of the GT1M* signal. The equation for the LGT1MEG signal is:

$$LGT1MEG = (GT1M \times HALE) + (LGT1MEG \times HALE*) + (GT1M \times LGT1MEG)$$

The LGT1MEG signal thus stays asserted during the memory address cycle.

A signal referred to as M16EN is enabled if a memory address in the desired 128 kbyte memory space address range is decoded and the respective M16* signal decode represented by the W1 or W2 signal is a high value. The equation for the M16EN signal is:

$$M16EN = (LGT1MEG* \times LA<19> \times LA<18> \times LA<17>* \times LA<16>* \times W1*) + (LGT1MEG* \times LA<19> \times LA<18> \times LA<17>* \times LA<16> \times W2*)$$

The M16EN signal is asserted if the W1* signal is asserted low and an address between 000C 0000h and 000C FFFFh is being addressed or if the W2* signal is asserted low and an address between 000D 0000h and 000D FFFFh is being addressed.

The M16EN signal is provided to the tri-state control input of one output driver in the PAL 200. The input to the output driver is connected to a logic one level and the inverted output is connected to the M16* line to produce the M16* signal when enabled. Therefore, the M16* signal output from the PAL 200 is floated if the M16EN signal is a low value, and the M16* signal is asserted low if the M16EN signal is a high value. Thus the M16* signal is driven low when the appropriately addressed bit on the flip-flops 202 or 204 is high, thus indicating that the particular 8 kbyte block contains a 16 bit device.

While the preferred embodiment utilizes flip-flops to store the decode values, a random access memory (RAM) could be used, with the appropriate LA address lines being connected to the address lines of the RAM to remove the need for the multiplexers. Alternatively, the RAM could have a multiple bit output, with a multiplexer selecting from the bits and the address lines of the RAM providing a second level of selection. The RAM would preferably be small so that a PAL would still be used for complete decode and final driving of the M16* line.

Therefore, a new decode to develop the M16* signal from the LA<> address lines is provided to allow the M16* signal to appear sooner on the control bus for external add-in cards that decode the M16* signal from the SA<> address lines, thus meeting EISA decode timing requirements.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

We claim:

1. In a microprocessor based computer system having a microprocessor a slower speed address bus, a higher speed address bus, a control bus and a peripheral device said microprocessor coupled to said slower speed address bus, high speed address bus and control bus to provide addresses and control signals of operational cycles, the address values on the higher speed address being provided before the address values on the slower speed address but, said peripheral device coupled to said slower speed address bus and control bus to receive operational cycles from said microprocessor, said peripheral device generating a control signal to said control bus from the slower speed address bus when an operational cycle is directed to said peripheral device, an apparatus for generating the control signal from the higher speed address bus to provide faster response times, comprising:

means connected to the control bus for storing decode values corresponding to address ranges of said peripheral device;

means coupled to said decode value storing means and to the higher speed address bus for selecting from said means for a stored decode value matching the address range of said peripheral device; and means coupled to said selecting means for providing the control signal on the control bus at the gate of the higher speed address bus based on the decode value from said means for selecting.

2. The apparatus of claim 1, wherein said decode value storing means includes flip-flops.

3. The apparatus of claim 2, wherein said selecting means includes a multiplexer whose inputs are connected to said flip-flops.

4. The apparatus of claim 1, wherein said decode value storing means is coupled to the microprocessor and further comprising:

means for causing data values produced by the microprocessor representing decode values to be stored in said decode value storing means.

* * * * *

UNITED STATES PATENT AND TRADEMARK OFFICE
CERTIFICATE OF CORRECTION

PATENT NO. : 5,423,021
DATED : JUNE 6, 1995
INVENTOR(S) : GARY W. THOME ET AL.

It is certified that error appears in the above-identified patent and that said Letters Patent is hereby corrected as shown below:

In col. 7, line 12, after "device" insert --,--.

In col. 7, line 16, after "address" insert --bus--.

In col. 7, line 19, please replace "but" with --bus--.

In col. 8, line 8, after "for" insert --storing--.

In col. 8, line 11, please replace "gate" with --rate--.

Signed and Sealed this

Twenty-sixth Day of September, 1995

Attest:

BRUCE LEHMAN

Attesting Officer      Commissioner of Patents and Trademarks